(12) United States Patent
Winkler et al.

(10) Patent No.: US 9,098,550 B2
(45) Date of Patent: Aug. 4, 2015

(54) SYSTEMS AND METHODS FOR PERFORMING DATA ANALYSIS FOR MODEL PROPOSALS

(75) Inventors: Patrick Winkler, Heidelberg (DE); Klaus Nagel, Heidelberg (DE); Marcus Hoepfner, Walldorf (DE)

(73) Assignee: SAP SE, Walldorf, DE (US)

( * ) Notice: Subject to any disclaimer, the term of this patent is extended or adjusted under 35 U.S.C. 154(b) by 143 days.

(21) Appl. No.: 13/473,860

(22) Filed: May 17, 2012

(65) Prior Publication Data
US 2013/0311456 A1 Nov. 21, 2013

(51) Int. Cl.
*G06F 7/00* (2006.01)
*G06F 17/30* (2006.01)

(52) U.S. Cl.
CPC .................................. *G06F 17/3053* (2013.01)

(58) Field of Classification Search
CPC ................................................ G06F 17/30569
USPC ........................................................ 707/748
See application file for complete search history.

(56) References Cited

U.S. PATENT DOCUMENTS

| | | | | | |
|---|---|---|---|---|---|
| 5,701,453 | A | * | 12/1997 | Maloney et al. | 707/714 |
| 2004/0213455 | A1 | * | 10/2004 | Lossev et al. | 382/159 |
| 2005/0267687 | A1 | * | 12/2005 | Tomii | 702/19 |
| 2005/0278139 | A1 | * | 12/2005 | Glaenzer et al. | 702/179 |
| 2007/0005154 | A1 | * | 1/2007 | Lancaster et al. | 700/49 |
| 2008/0294620 | A1 | * | 11/2008 | Churin et al. | 707/5 |
| 2010/0125613 | A1 | * | 5/2010 | Wiljanen et al. | 707/803 |

* cited by examiner

*Primary Examiner* — Jason Liao
(74) *Attorney, Agent, or Firm* — Fountainhead Law Group PC

(57) ABSTRACT

In one embodiment, a computer-implemented method comprises receiving a query. A data store stores data as a plurality of data sets. Each data set comprises a plurality of fields and a plurality of data elements. Each field is associated with a portion of data elements. The query identifies selected data sets and selected properties of the selected data sets. For each selected property, the data elements of the selected data sets associated with each selected property are determined. A first rating of the determined data elements of the selected data sets is determined based on a type of combination of a pair of selected data sets. For the selected data set pairs, a second rating of the pair is determined based on the first ratings for the selected properties. A model of a combination of the selected data sets is generated based on the second rating.

17 Claims, 10 Drawing Sheets

| Calendar day | Customer ID | Customer Home Country | Customer Industry Segment | Product | Product Group | Sales Channel | Country Version | Amount Sold | Net Sales |
|---|---|---|---|---|---|---|---|---|---|
| 05.06.2010 | APEL AG | DE | OTHERS | SHORTS | APPAREL | 5 | MX | 1 | 470,00 |
| 20.02.2010 | STEAKS | DE | CATERING | BANNER | OTHERS | 4 | ES | 1 | 560,00 |
| 26.08.2010 | STEAKS | DE | CATERING | BANNER | OTHERS | 5 | US | 1 | 350,00 |
| 07.06.2010 | STEAKS | DE | CATERING | BANNER | OTHERS | 2 | NL | 1 | 670,00 |
| 17.02.2010 | BELDE | DE | BEVERAGE | SNEAKERS | FOOTWEAR | 5 | DE | 1 | 470,00 |
| 07.05.2010 | KOELN | DE | CATERING | SHIRT_S | APPAREL | 2 | SA | 1 | 660,00 |
| 03.04.2010 | MAYER | DE | BEVERAGE | SHIRT_S | APPAREL | 2 | US | 1 | 580,00 |
| 28.05.2010 | BERLIN | DE | CATERING | VUVUZELA | OTHERS | 3 | SA | 1 | 190,00 |
| 17.08.2010 | MAYER | DE | BEVERAGE | SHIRT_S | APPAREL | 2 | FR | 1 | 710,00 |
| 25.02.2010 | BELDE | DE | BEVERAGE | SNEAKERS | FOOTWEAR | 5 | DE | 1 | 480,00 |

FIG. 4

| Customer | Rating |
|---|---|
| ABI | A |
| BASEL | A |
| BELDE | A |
| CUCUCULA | A |
| DAMLER | A |
| HALTON | A |
| INTERCONT | A |
| KIOSKAG | A |
| LADL | A |
| MATRO | A |
| MCDOLD | A |
| MENEKEN | A |
| PAPSICO | A |
| SAP | A |
| TRUESTEN | A |
| ZAPFLE | A |

FIG. 5

| Customer | SalesRep | Team |
|---|---|---|
| ALBINORD | Bill | A-Team |
| BASEL | Bill | A-Team |
| BESTEASTER | Bill | A-Team |
| CUCUCULA | Bill | A-Team |
| ALBISUED | Dave | A-Team |
| BELDE | Dave | A-Team |
| CHEAP | Dave | A-Team |
| DAMLER | Dave | A-Team |
| ABI | Joe | A-Team |
| APEL AG | Joe | A-Team |
| BERLN | Joe | A-Team |
| CHOVWVAN | Joe | A-Team |
| FARD | Jim | Dream-Team |
| HALTON | Jim | Dream-Team |
| HEXMEX | Jim | Dream-Team |
| HOLIDAYOUT | Jim | Dream-Team |
| KIOSKAG | Jim | Dream-Team |
| FRANKFURT | Kent | Dream-Team |
| HAMBURG | Kent | Dream-Team |
| HIRSCH | Kent | Dream-Team |
| HURNBACHER | Kent | Dream-Team |
| KOBLN | Kent | Dream-Team |
| DB | Sara | Dream-Team |
| GLUGGLUG | Sara | Dream-Team |
| HEDELBERG | Sara | Dream-Team |
| HITTIAG | Sara | Dream-Team |
| INTERCONT | Sara | Dream-Team |
| LADL | Ben | Super-Team |
| MCDOLD | Ben | Super-Team |
| MUNICH | Ben | Super-Team |
| REWA | Ben | Super-Team |
| SCHLUCKER | Ben | Super-Team |
| STEAKS | Ben | Super-Team |
| WV AG | Ben | Super-Team |

SYSTEMS AND METHODS FOR PERFORMING DATA ANALYSIS FOR MODEL PROPOSALS

BACKGROUND

The present invention relates to computing, and in particular, to systems and methods for performing data analysis for model proposals.

In business, academics, government and politics, quick reaction to new situations requires that new information is available in-time. Often this new information is local information from a local source in form of local files, which is external to and not maintained in a central business intelligence or data warehouse. Often the local information needs to be combined with the centrally stored information. The local information is often stored in fields different from the fields of the centrally stored information. Further, the local information may be a different file type with different data fields.

For example, the team lead of a sales department wants to analyze the year-end revenue figures for his highest ranked customers and wants to build special sales teams in his group to address these customers. The revenue figures may come from the data warehouse. The sales department may store the rankings of the customers locally, and not in the data warehouse. Further, the team leader may store locally the grouping of the team members into special year-end sales teams. The grouping may be changed frequently.

One problem associated with combining the data is that the data is stored in different data file formats, with different fields, and with large numbers of data records. It is generally desirable to combine data sets so the data sets can be used collectively. However, the complex data types and concatenations used to create a data mapping model may be difficult for a user that has no or little technical background in query and database management programming tools. Consequently, there exists a need for improved systems and methods for performing data modeling.

SUMMARY

Embodiments of the present invention include systems and methods for performing data analysis for model proposals. In one embodiment, the present invention includes a computer-implemented method comprising receiving a query in a controller, wherein a data store stores data as a plurality of data sets, each data set comprises a plurality of fields and a plurality of data elements, and wherein each field is associated with a portion of data elements, and wherein the query identifies selected data sets and selected properties of the selected data sets. The method further includes determining, by the controller, for each of the selected properties, which of the data elements of the selected data sets are associated with said each selected property, determining, for each of the selected properties, a first rating of the determined data elements of the selected data sets based on a type of combination of a pair of selected data sets, determining, for said pair of selected data sets, a second rating of said pair of selected data sets based on the first ratings for the selected properties, and generating a model of a combination of the selected data sets based on the second rating.

In one embodiment, the method further includes weighting the first ratings.

In one embodiment, determining a second rating further includes summing a product of a weight of the first rating and the first rating for all selected properties.

In one embodiment, weights of the first ratings are based on the characteristics of a corresponding property.

In one embodiment, the first rating is based on a binding type of said pair of selected data sets.

In one embodiment, the first rating is normalized.

In one embodiment, the properties are selected from a group of a model of previous combinations of data sets, metadata of the selected data sets, content of the selected data sets, and a model of data sets in the data store.

In one embodiment, the data sets are arranged in columns of data elements, and a field is associated with a column.

In one embodiment, the type of combination is a join operation based on two columns associated with said each selected field.

In another embodiment, the present invention includes a computer readable medium embodying a computer program for performing a method and embodiments described above.

In another embodiment, the present invention includes a computer system comprising one or more processors implementing the techniques described herein. For example, the system includes a controller that receives a query. A data store stores data as a plurality of data sets. Each data set comprises a plurality of fields and a plurality of data elements. Each field is associated with a portion of data elements. The query identifies selected data sets and selected properties of the selected data sets. The controller determines, for each of the selected properties, which of the data elements of the selected data sets are associated with said each selected property. The controller determines, for each of the selected properties, a first rating of the determined data elements of the selected data sets based on a type of combination of a pair of selected data sets. The controller determines, for said pair of selected data sets, a second rating of said pair of selected data sets based on the first ratings for the selected properties. The controller generates a model of a combination of the selected data sets based on the second rating.

The following detailed description and accompanying drawings provide a better understanding of the nature and advantages of the present invention.

BRIEF DESCRIPTION OF THE DRAWINGS

FIG. 4 illustrates example table data for a warehouse data store of FIG. 1.

FIG. 5 illustrates a first example table data for a local data store of FIG. 1.

FIG. 6 illustrates a second example table data for a local data store of FIG. 1

FIG. 9 illustrates an example table of a mapping proposal according to an embodiment of the present invention.

DETAILED DESCRIPTION

Described herein are techniques for performing data analysis for model proposals. The apparatuses, methods, and techniques described below may be implemented as a computer program (software) executing on one or more computers. The computer program may further be stored on a computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
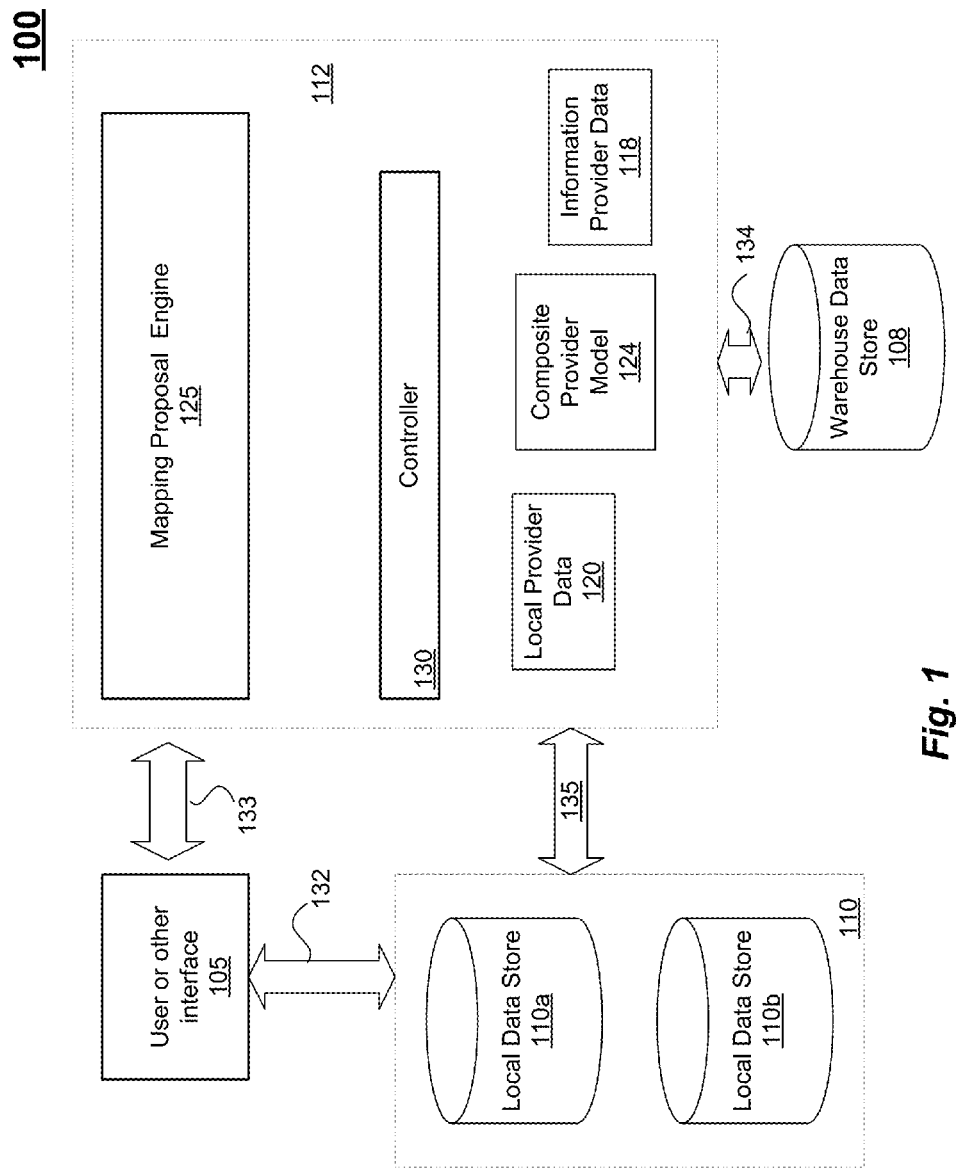
FIG. 1 is a schematic representation of a system for performing data analysis for model proposals according to an embodiment of the present invention.

FIG. 1 is a schematic representation of a system 100 for performing data analysis for model proposals according to an embodiment of the present invention. System 100 includes a user or other interface 105, a warehouse data store 108, a local data store 110, and a mapping model system 112. In the following description, the term "local data store" is used interchangeably with "local database," and the term "warehouse data store" is used interchangeably with "warehouse database." Local data store 110 may comprise one or more local data stores. For clarity and simplicity, only two local data stores (i.e., local data store 110a and local data store 110b) are shown. Warehouse data store 108 may comprise one or more warehouse data stores. Mapping model system 112 comprises information provider data 118, local provider data 120, a mapping proposal engine 125, a composite provider data store including a composite provider model 124, a mapping proposal engine 125, and a controller 130.

Information is conveyed between user interface 105, data stores 108 and 110, and mapping model system 112, along data flow paths 132, 133, 134, and 135. For example, mapping model system 112 accesses the contents of warehouse database 108 and local database 110 over data flow paths 134 and 135, respectively, when generating mapping proposals.

Information provider data 118 is a set of data that is stored in warehouse database 108. Local provider data 120 is a set of data that is stored in local database 110. Local database 110 may be of a file type (e.g., a comma-separated values (CSV) file, or a spreadsheet file, such as a Microsoft® Excel file) that is different from the file type of warehouse database 108.

A composite provider model 124 is a model that combines data from information provider data 118 or local provider data 120 or both. Mapping proposal engine 125 executes a process or algorithm that analyzes data sets from information provider data 118, data sets from local provider data 120, and current or previous composite provider model 124 and generates a proposed composite provider model 124 based on the analysis. Mapping proposal engine 125 analyzes various properties of the data sets for generating the proposed composite provider model 124. Mapping proposal engine 125 combines data from multiple databases 108 and 110 by performing automated data analyses of the data with little or no interaction by the user, and generates and provides to the user proposed composite provider model 124 with suggested mappings that are semantically and logically correct with minimal or no post-analysis interaction by the user.

User or other interface 105 is a collection of one or more data input/output devices for interacting with a human user or with another data processing system to receive and output data. For example, interface 105 can be a presentation system, one or more software applications, or a data communications gateway, for example. Data flow path 132 is data communicated over interface 105 that retrieves data from or causes a change to data stored in local database 110. Such changes include the insertion, deletion, or modification of all or a portion of the contents of local database 110. Data output over interface 105 can present the results of data processing activities in system 100. For example, data flow path 133 can convey the results of queries or other operations performed on mapping model system 112 for presentation on a monitor or a data communications gateway.

Warehouse data store 108 is a collection of information that is stored at one or more data machine readable storage devices (e.g., data stores). Warehouse data store 108 may be a single data store or multiple data stores, which may be coupled to one or more software applications for storing application data. Warehouse data store 108 stores the information in one or more models. Warehouse data store 108 may store data as a plurality of data records. Each data record comprises a plurality of data elements (e.g., fields of a record). Warehouse data store 108 may include different structures and their relations (e.g., data store tables, data records, fields, and foreign key relations). Additionally, different structures and fields may include data types, descriptions, or other metadata, for example, which may be different for different models. Data flow path 134 conveys information describing changes to data stored in warehouse data store 108 between mapping model system 112 and warehouse data store 108 Such changes include the insertion, deletion, and modification of all or a portion of the contents of one or more warehouse data stores.

Local data store 110 is a collection of information that is stored at one or more data machine readable storage devices (e.g., data stores). Local data store 110 may be a single data store or multiple data stores, which may be coupled to one or more software applications for storing application data. Local data store 110 stores the information in one or more models. Local data store 110 may store data as a plurality of data records. Each data record comprises a plurality of data elements (e.g., fields of a record). Local data store 110 may include different structures and their relations (e.g., data store tables, data records, fields, and foreign key relations). Additionally, different structures and fields may include data types, descriptions, or other metadata, for example, which may be different for different models. Data flow path 135 conveys information describing changes to data stored in local data store 110 between mapping model system 112 and local data store 110 Such changes include the insertion, deletion, and modification of all or a portion of the contents of one or more local data stores.

Mapping model system 112 is a collection of data processing activities (e.g., one or more data analysis programs or methods) performed in accordance with the logic of a set of machine-readable instructions. The data processing activities can include running queries on the contents of both warehouse data store 108 and local data store 110. The results of such queries can be aggregated to yield an aggregated result set. A query is a request for information. A result set is a set of information that answers a query. An aggregated result set is a set of information from two or more data stores that answers a query, such as from warehouse data store 108, a local data store 110. The set of information in an aggregated result set can be, for example, a union of the results of independent queries on the two or more data stores. The aggregated result sets can be conveyed to interface 105 over data flow path 133. Interface 105 can, in turn, render the aggregated result sets over an output device for a human or other user or to other systems. This output of aggregated result sets drawn from mapping model system 112, based on data from warehouse data store 108 and local data store 110, allows system 100 to accurately portray the contents of different data stores having different data models.

Queries from the mapping proposal engine 125 may be received by controller 130. Controller 130 may be a component on the same system as a data warehouse or part of a different system and may be implemented in hardware, software, or as a combination of hardware and software, for example. Controller 130 receives a query from mapping proposal engine 125 and generates one or two requests based on the received query depending on whether one or both of warehouse data store 108 and local data store 110 are to be accessed. Warehouse data store 108 and local data store 110 transform the request from controller 130 into query syntax (e.g., SQL) compatible with the data store, and the SQL query may specify specific tables and fields to be read from the data store.

Controller 130 receives data from one or both of warehouse data store 108 and local data store 110 in response to the request. In responding to the query from mapping proposal engine 125, controller 130 may aggregate the data from warehouse data store 108 and local data store 110. The aggregation may be implemented with a union operation, for example. Finally, controller 130 returns the aggregated data to mapping proposal engine 125 in response to the query.

Figure 2:
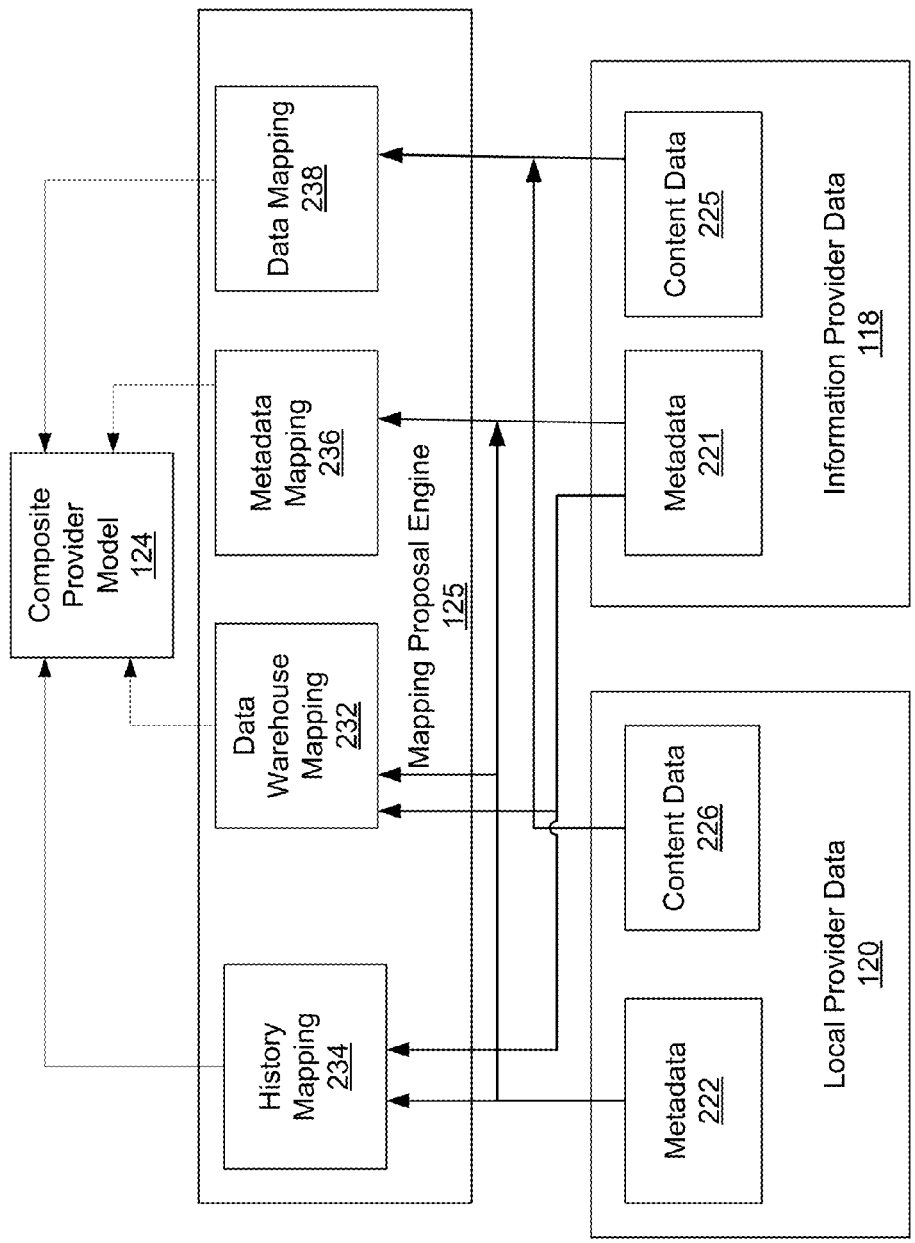
FIG. 2 illustrates a mapping proposal engine of the system of FIG. 1 according to an embodiment of the present invention.

FIG. 2 illustrates the mapping proposal engine 125. Mapping proposal engine 125 comprises a warehouse model mapping engine 232, a history mapping engine 234, a metadata mapping engine 236, and a data mapping engine 238. The mapping engines of mapping proposal engine 125 analyze information provider data 118, local provider data 120, and composite provider model 124 and generate a model for combination of the selected data based on the selected properties.

In an illustrative example, the user may select one through four of four properties for mapping. A first property is a data warehouse model in warehouse database 108 that may be formed from a subset of information provider data 118. Data warehouse model mapping engine 232 processes the mapping of the first property. Data warehouse model mapping engine 232 searches information provider data 118 for a current or previously existing model that uses a subset of the selected set of information provider data 118. Data warehouse model mapping engine 232 may also use metadata information 221 of information provider data 118 and metadata information 222 of local provider data 120 for generating the composite provider model 124. In some embodiments, data warehouse model mapping engine 232 uses the binding type and the column pairs used for the union/join condition in the model to generate a rating (e.g., a positive rating, such as described below on conjunction with FIG. 7), and applies the rating to the selected set of information provider data 118. In some embodiments, information provider data 118 is maintained by an entity (such as an information technology group), other than the entity maintaining local provider data 120. The data warehouse model mapping may be presumed to be valid by mapping proposal engine 125. As described below in conjunction with FIG. 7, the weighting of the data warehouse model mapping may be high because of the presumption of validity.

A second property is currently or previously existing composite provider model 124, which may be formed from a subset of information provider data 118 and local provider data 120. History mapping engine 234 processes the mapping of the second property. History mapping engine 234 searches for a currently or previously existing model in composite provider model 124 that uses a subset of the selected set of information provider data 118 or the selected set of local provider data 120, or both. Current or previous composite provider model 124 that represents valid combinations of data may provide a template for history mapping engine 234 to generate a new composite provider model 124 with a similar set of information provider data 118 or local provider data 120. History mapping engine 234 may also use metadata information 221 of information provider data 118 and metadata information 222 of local provider data 120 for generating the composite provider model 124. In some embodiments, history mapping engine 234 uses the binding type and the column pairs used for the union/join condition in composite provider model 124 to generate a rating (e.g., a positive rating, such as described below on conjunction with FIG. 7), and applies the rating to the selected set of information provider data 118 or the selected set of local provider data 120 or both.

A third property is metadata information 221 of information provider data 118 and metadata information 222 of local provider data 120. Metadata mapping engine 236 processes the mapping of the third property. Metadata mapping engine 236 compares the columns of information provider data 118 and local provider data 120 on a metadata level (e.g. the name of the column or the description). If two columns have a high similarity based on the comparison, metadata mapping engine 236 rates a union/join condition based on this pair of columns with, for example, a positive rating. Otherwise, if there is no similarity, metadata mapping engine 236 rates the join condition with a rating that is, for example, negative.

A fourth property is content data 225 of information provider data 118 and connect data 226 of local provider data 120. Data mapping engine 238 processes the mapping of the fourth property. Data mapping engine 238 compares the content of the columns of information provider data 118 and local provider data 120. Data mapping engine 238 uses the comparison to determine a rating based on the amount of data that is common between information provider data 118 and local provider data 120. In the illustrative rating system described below on conjunction with FIG. 7, no common data results into a negative rating, and the rating is otherwise positive. If two columns have common data, a join condition using these columns is valid, and the result set is non-empty. In some embodiments, the data mapping property is not used to determine a rating regarding the binding type. In some embodiments, information provider data 118 is indexed for searching.

Figure 3:
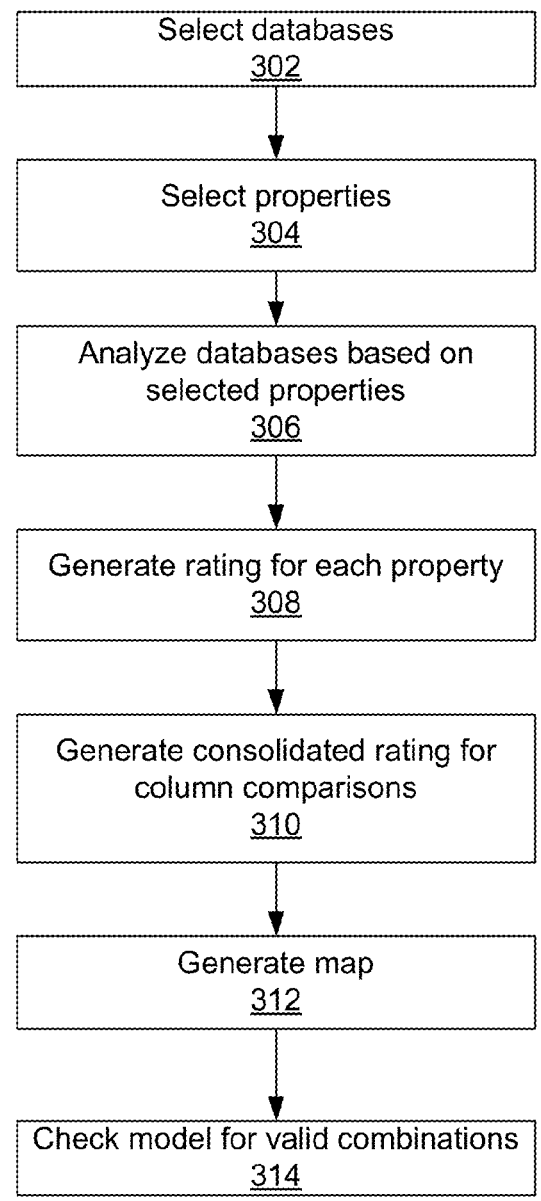
FIG. 3 illustrates a process for data modeling according to an embodiment of the present invention.

FIG. 3 illustrates a process for data modeling according to an embodiment of the present invention. The process illustrated in FIG. 3 is described using the example data illustrated in FIGS. 4-6, which are example tables for warehouse database 108, local database 110a, and local database 110b, respectively.

FIG. 4 illustrates example table data for warehouse data store 108. The data is maintained and stored in data warehouse database 108. The table has a granularity that includes calendar day, customer identification, customer home country, customer industry segment, product, product group, sales channel, country version, amount sold and net sales.

FIG. 5 illustrates a first example table data for local data store 110. The data is maintained and stored in local database 110. The table has a granularity that includes customer and rating. As can be seen, the table of FIG. 4 has higher and different granularity than the table of FIG. 5.

FIG. 6 illustrates a second example table for local data store 110. The data is maintained and stored in local database 110. The table has a granularity that includes customer, sales representative, and team. As can be seen, the table of FIG. 4 has higher and different granularity than the table of FIG. 6.

Referring again to FIG. 3, at 302, the databases that are to be combined are selected. In some embodiments, one or more of local database 110 or warehouse database 108 or both are selected. In some embodiments, the user selects the databases. For example, the user selects the databases shown in FIG. 4 from data warehouse 108 and the two databases shown in FIGS. 5-6 from local database 110. In some embodiments, the user selects the databases from local database 110, and mapping proposal engine 125 selects the databases from warehouse database 108. At 304, the properties that are to be used for the analysis are selected. The user or mapping proposal engine 125 may select some or all of the properties. For example, the properties may be warehouse data model, history, metadata, or content data.

At 306, mapping proposal engine 125 independently analyzes the selected databases to determine similarities between the data based on the selected properties. At 308, mapping proposal engine 125 generates a rating for each property. One embodiment for generating ratings is described below in conjunction with FIG. 7. In some embodiments, data warehouse model mapping engine 232 generates a rating based on warehouse data; history mapping engine 234 generates a rating based on a current or previously existing warehouse data model; metadata mapping engine 236 generates a rating based on metadata information 221 and metadata information 222; and data mapping engine 238 generates a rating based on the content of the columns of information provider data 118 and local provider data 120.

At 310, mapping proposal engine 125 consolidates the ratings to form a match rating between columns of the selected databases for all possible column pairs. Illustrative embodiments for generating match ratings are described below in conjunction with FIG. 8.

At 312, mapping proposal engine 125 creates composite provider model 124. Mapping proposal engine 125 maps the column x of the composite provider model 124 and the column y of the local provider data 120 with the overall highest rating are mapped, and excludes other possible matches, until no rating Rxy greater than zero remains.

In some embodiments, mapping model system 112 does not create composite provider model 124 and provides information about the ratings so the user can use this information in his modeling process.

At 314, mapping proposal engine 125 checks composite provider model 124 for data integrity, such as valid aggregation. In some embodiments, mapping proposal engine 125 checks composite provider model 124 to determine whether every selected column of warehouse database 108 and local database 110 has a valid union/join condition.

Because mapping proposal engine 125 independently analyzes these properties, mapping proposal engine 125 may also exclude some of the properties from the main analyzing process, which may increase performance, or may exclude properties which lead to poor rating quality in certain circumstances.

Figure 7:
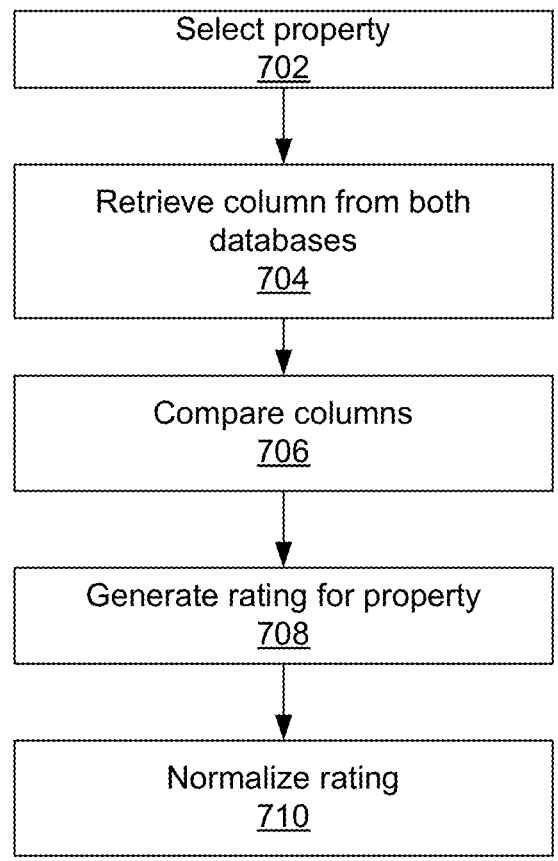
FIG. 7 illustrates a process for analyzing databases and generating a rating according to an embodiment of the present invention.

FIG. 7 illustrates a process for analyzing databases and generating a rating according to an embodiment of the present invention. Mapping proposal engine 125 independently analyzes each of these properties and generates a rating. At 702, mapping proposal engine 125 selects a property (e.g., property i) to use for analyzing data of databases 108 and 110. At 704, mapping proposal engine 125 retrieves a column (e.g., column x) from the first selected database and a column (e.g., column y) from the second selected database. At 706, mapping proposal engine 125 compares a column (e.g., column x) from the first selected database and a column (e.g., column y) from the second selected database. At 708, mapping proposal engine 125 generates a rating regarding the binding type of any pair of data 118, 120 and 124 (e.g., union/join) and a rating regarding which columns of the data sets should be used for the combination (e.g., a union/join condition). At 710, mapping proposal engine 125 normalizes the ratings to generate a normalized rating $r_i(x,y)$ which is the normalized rating r from the analysis of property i for column x and column y. In some embodiments, the rating is normalized to a value between −1 and 1, with 0 meaning the analysis result is neutral. For example, if the selected information provider data 118 has never been modeled in composite provider model 124, the rating for a history mapping analysis is neutral because mapping proposal engine 125 has no information to base a rating on.

Figure 8:
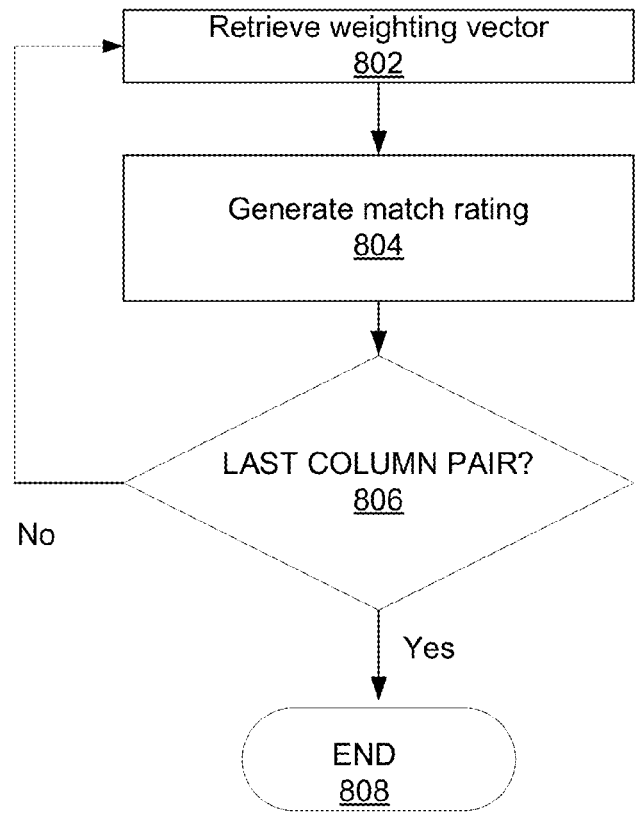
FIG. 8 illustrates a process for generating a match rating based on consolidating the ratings from the comparisons between columns of the selected databases according to an embodiment of the present invention.

FIG. 8 illustrates a process for generating a match rating based on consolidating the ratings from the comparisons between columns of the selected databases. For example, the comparison is between a column of local provider data 120 and a column of composite provider model 124.

At 802, mapping proposal engine 125 retrieves a weighting vector for the selected properties of the selected databases. Each property i is labeled with a weight attribute defining its importance: Columns that have common data or have been previously combined in warehouse database 108 are more likely to be a good match, and to be a better match than other mappings, such as metadata matching (e.g., similar column names). In some embodiments, the weight vector w is based on a priori knowledge of properties of local database 110. In some embodiments, the weight vector is:

$$w = \begin{pmatrix} w_W \\ w_D \\ w_H \\ w_M \end{pmatrix}$$

where $W_W$ is the weight of the data warehouse model from the data warehouse mapping engine 232, where $W_D$ is the weight of the data mapping model from the data mapping engine 238, where $W_H$ is the weight of the history mapping model from the history mapping engine 234, and where $W_M$ is the weight of the metadata mapping model from the metadata mapping engine 236.

The weigh vector w may be selected to provide significant differences (such as an order of magnitude) in the weights for the mapping. In some embodiments the weight vector w is:

$$w = \begin{pmatrix} 1000 \\ 100 \\ 10 \\ 1 \end{pmatrix}$$

At 804, mapping proposal engine 125 generates a match rating for the compared columns for all properties based on the rating for each property. In some embodiments, the match rating is based on weighting of the properties.

In some embodiments, mapping proposal engine 125 generates a match ranking using the following equation:

$$R_{xy} = \sum_{i=1}^{n} w_i \times r_i(x, y)$$

where $R_{xy}$ is a match rating for column x of composite provider model 124 and column y of local provider data 120, where $w_i$ is a weight for the property i, and $r_i(x,y)$ is the normalized rating of property i generated at 710 (see FIG. 7). At 806, if the last column pair has not been analyzed, the weighting vector is retrieved at 802 for the next column pair. Otherwise, at 806, if the last column pair has been analyzed, at 808, the match ratings are completed.

In an illustrative example, if the rating of the data mapping by data mapping engine 238 indicates that the columns have no common data, the rating is negative. Given the illustrative weight vector, even positive ratings from the history mapping analysis by history mapping engine 234 and/or the metadata mapping analysis by metadata mapping engine 236 does not result in a positive final rating.

In another illustrative example, the rating for the data mapping by the data mapping engine 238 rating indicates that two columns of composite provider model 124 have the same content as the column of local provider data 120, but one column of the composite provider model 124 has a higher metadata mapping rating by metadata mapping engine 236, (e.g. because their names are identical). In this example, the final rating is higher, and the analysis results in a better match.

Figure 9:
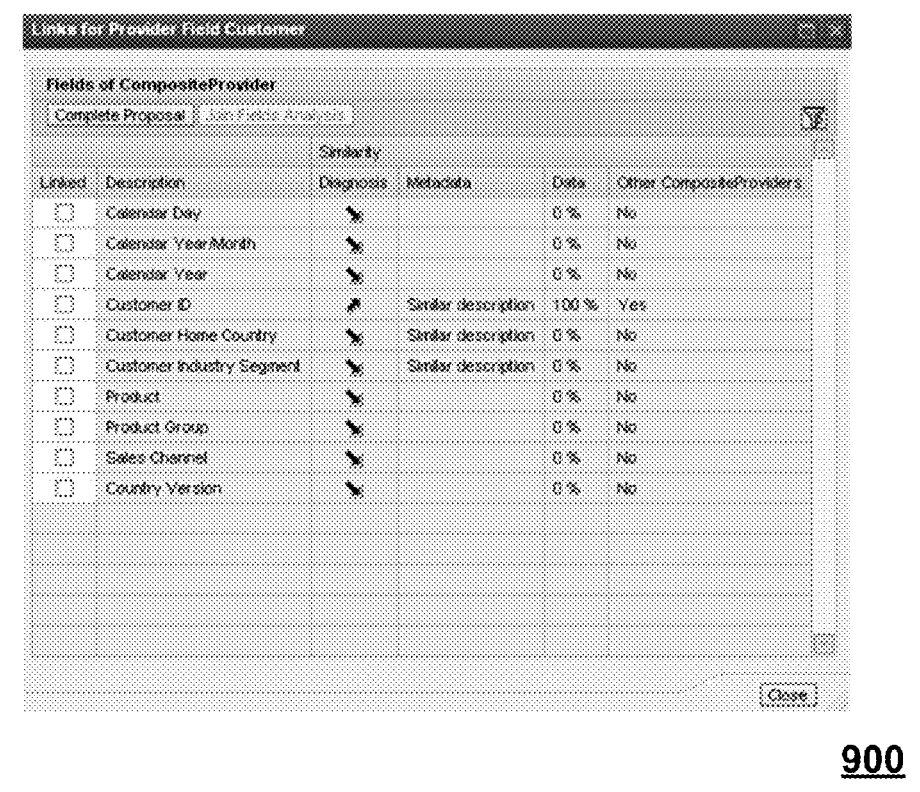

FIG. 9 illustrates a table of the result of mapping proposal engine 125. Using the data of the illustrative examples of FIGS. 4-6, mapping proposal engine 125 generates a screenshot 900 to display the mapping results of mapping proposal engine 125 including the possible matches between the "revenue figures" of the information provider data 118 and the "customer rankings" of local provider data 120, restricted to the column "Customer" of the local provider data 120.

In screenshot, except the column "Customer 10", all columns receive a negative rating because the data similarity is 0%. The rating for "Customer Home country" and "Customer Industry Segment" is negative even if metadata mapping engine 236 assigns a positive rating because of similar description. Additionally, the rating of the column "Customer ID" is increase by the positive rating of the metadata mapping and history mapping. Thus, mapping proposal engine 125 maps the "Customer" column of local database 110 that includes "customer rankings" and the "Customer ID" column of information provider data 118 that includes "revenue figures."

Figure 10:
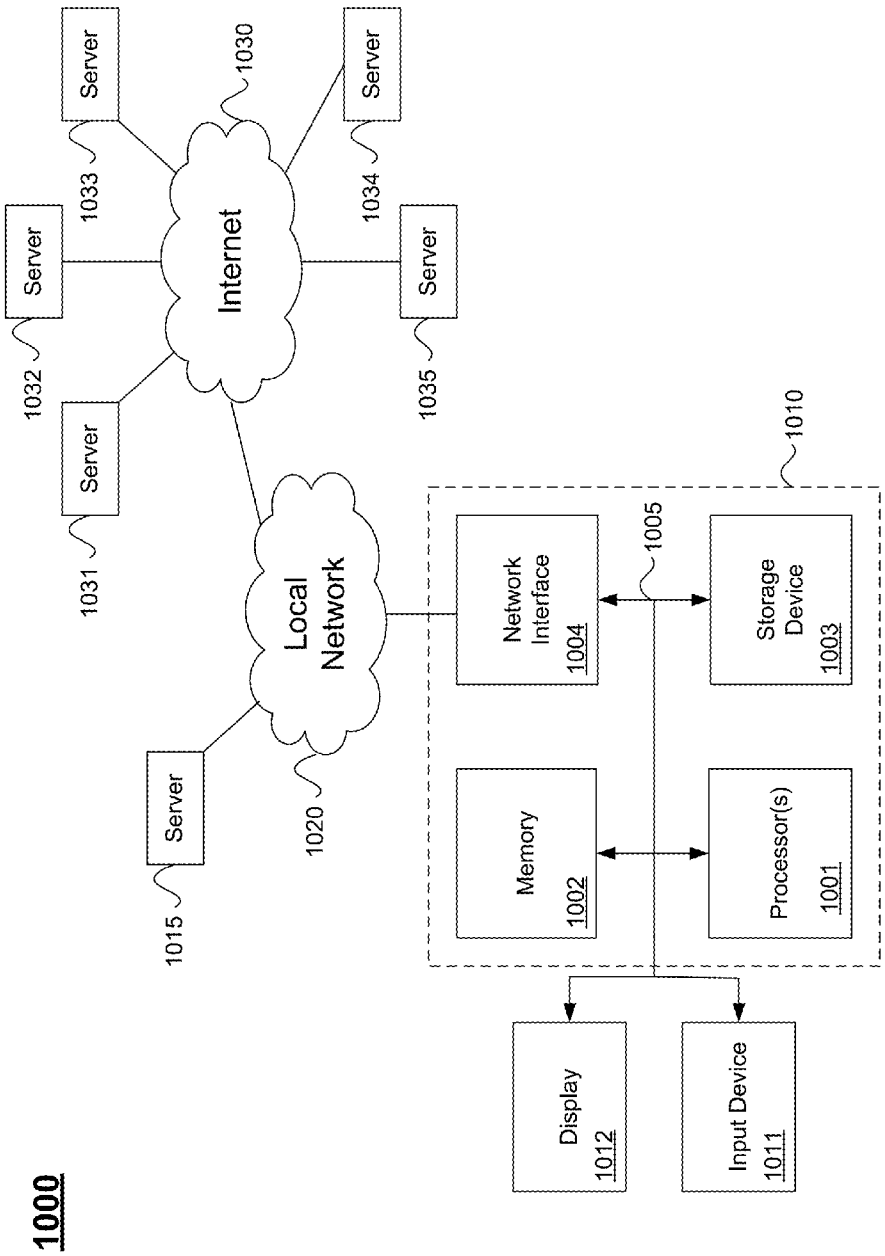
FIG. 10 illustrates hardware used to implement embodiments of the present invention.

FIG. 10 illustrates hardware used to implement embodiments of the present invention. An example computer system 1010 is illustrated in FIG. 10. Computer system 1010 includes a bus 1005 or other communication mechanism for communicating information, and one or more processors 1001 coupled with bus 1005 for processing information. Computer system 1010 also includes a memory 1002 coupled to bus 1005 for storing information and instructions to be executed by processor 1001, including information and instructions for performing the techniques described above, for example. This memory may also be used for storing variables or other intermediate information during execution of instructions to be executed by processor 1001. Possible implementations of this memory may be, but are not limited to, random access memory (RAM), read only memory (ROM), or both. A machine readable storage device 1003 is also provided for storing information and instructions. Common forms of storage devices include, for example, a non-transitory electromagnetic medium such as a hard drive, a magnetic disk, an optical disk, a CD-ROM, a DVD, a flash memory, a USB memory card, or any other medium from which a computer can read. Storage device 1003 may include source code, binary code, or software files for performing the techniques above, for example. Storage device 1003 and memory 1002 are both examples of computer readable mediums.

Computer system 1010 may be coupled via bus 1005 to a display 1012, such as a cathode ray tube (CRT) or liquid crystal display (LCD), for displaying information to a computer user. An input device 1011 such as a keyboard and/or mouse is coupled to bus 1005 for communicating information and command selections from the user to processor 1001. The combination of these components allows the user to communicate with the system, and may include, for example, user interface 105. In some systems, bus 1005 may be divided into multiple specialized buses.

Computer system 1010 also includes a network interface 1004 coupled with bus 1005. Network interface 1004 may provide two-way data communication between computer system 1010 and the local network 1020, for example. The network interface 1004 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1004 sends and receives electrical, electromagnetic, or optical signals that carry digital data streams representing various types of information.

Computer system 1010 can send and receive information, including messages or other interface actions, through the network interface 1004 across a local network 1020, an Intranet, or the Internet 1030. For a local network, computer system 1010 may communicate with a plurality of other computer machines, such as server 1015. Accordingly, computer system 1010 and server computer systems represented by server 1015 may be programmed with processes described herein. In the Internet example, software components or services may reside on multiple different computer systems 1010 or servers 1031-1035 across the network. Some or all of the processes described above may be implemented on one or more servers, for example. Specifically, local data store 110 and mapping model system 112 might be located on different computer systems 1010, and warehouse data store 108 may be on one or more servers 1015 and 1031-1035, for example: A server 1031 may transmit actions or messages from one component, through Internet 1030, local network 1020, and network interface 1004 to a component on computer system 1010. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
   receiving, by a computer, a query request for identifying a first data set, a second data set, and a plurality of mapping properties, the mapping properties include at least a previous model of the second data set;
   retrieving, by the computer, the first data set and the second data set, the first data set including data stored in a first field and the second data set including data stored in a plurality of fields;
   determining, by the computer, a plurality of similarity ratings for a field combination between the first field and a second field from the plurality of fields, the plurality of similarity ratings containing a similarity rating for each mapping property, wherein determining a first similarity rating comprises:
      determining, by the computer, a result set of common data between the data stored in the first field and the data stored in the second field;
      generating, by the computer, a negative value for the first similarity rating when the result set is empty; and
      generating, by the computer, a positive value for the first similarity rating when the result set is non-empty;
   determining, by the computer, a consolidated similarity rating according to the plurality of similarity ratings;
   generating, by the computer, a proposed model for combining the first data set and the second data set, wherein the first field is combined with the second field when the consolidated similarity rating is above a predefined threshold; and
   implementing, by the computer, the proposed model.

2. The computer-implemented method of claim 1, further comprising:
   generating, by the computer, a results table configured to report the similarity rating for each field combination between the first field and the plurality of fields.

3. The computer-implemented method of claim 1, wherein determining a second similarity rating comprises:
   identifying, by the computer, an existing data model that contains a subset of the data in the first data set;
   identifying, by the computer, a field combination in the existing data model, the field combination being at least two fields that were combined in the existing data model;
   determining, by the computer, a binding type used to create the existing model; and
   generating, by the computer, the second similarity rating according to the binding type and the field combination.

4. The computer-implemented method of claim 1, wherein determining a second similarity rating comprises:
   identifying, by the computer, first metadata associated with the first data set and second metadata associated with the second data set;
   comparing, by the computer, the first metadata and the second metadata; and
   generating, by the computer, the second similarity rating based on the comparison.

5. The computer-implemented method of claim 4, wherein the first metadata is the name of the first field and the second metadata is the name of the second field.

6. The computer-implemented method of claim 1, wherein the first similarity rating is weighted according to a weight factor associated with the mapping property.

7. A non-transitory computer readable storage medium storing one or more programs, the one or more programs comprising instructions for:
   receiving a query request for identifying a first data set, a second data set, and a plurality of mapping properties, the mapping properties include at least a previous model of the second data set;
   retrieving the first data set and the second data set, the first data set including data stored in a first field and the second data set including data stored in a plurality of fields;
   determining a plurality of similarity ratings for a field combination between the first field and a second field from the plurality of fields, the plurality of similarity ratings containing a similarity rating for each mapping property, wherein determining a first similarity rating comprises:
      determining a result set of common data between the data stored in the first field and the data stored in the second field;
      generating a negative value for the first similarity rating when the result set is empty; and
      generating a positive value for the first similarity rating when the result set is non-empty;
   determining a consolidated similarity rating according to the plurality of similarity ratings;
   generating a proposed model for combining the first data set and the second data set, wherein the first field is combined with the second field when the consolidated similarity rating is above a predefined threshold; and
   implementing the proposed model.

8. The non-transitory computer readable storage medium of claim 7, further comprising:
   generating a results table configured to report the similarity rating for each field combination between the first field and the plurality of fields.

9. The non-transitory computer readable storage medium of claim 7, wherein determining a second similarity rating comprises:
   identifying an existing data model that contains a subset of the data in the first data set;
   identifying a field combination in the existing data model, the field combination being at least two fields that were combined in the existing data model;
   determining a binding type used to create the existing model; and
   generating the second similarity rating according to the binding type and the field combination.

10. The non-transitory computer readable storage medium of claim 7, wherein determining a second similarity rating comprises:
    identifying first metadata associated with the first data set and second metadata associated with the second data set;
    comparing the first metadata and the second metadata; and
    generating the second similarity rating based on the comparison.

11. The non-transitory computer readable storage medium of claim 10, wherein the first metadata is the name of the first field and the second metadata is the name of the second field.

12. The non-transitory computer readable storage medium of claim 7, wherein the first similarity rating is weighted according to a weight factor associated with the mapping property.

13. A computer network comprising:
    a first computer system configured to generate a query request for identifying a first data set, a second data set, and a plurality of mapping properties, the mapping properties include at least a previous model of the second data set; and a second computer system configured to:
> receive the query request from the first computer system;
> retrieve the first data set and the second data set in response to the search request, the first data set including data stored in a first field and the second data set including data stored in a plurality of fields;
> determine a plurality of similarity ratings for a field combination between the first field and a second field from the plurality of fields, the plurality of similarity ratings containing a similarity rating for each field combination between the first field and the plurality of fields according to each mapping property, wherein determining a first similarity rating comprises:
>> determining a result set of common data between the data stored in the first field and the data stored in a second field;
>> generating a negative value for the first similarity rating when the result set is empty; and
>> generating a positive value for the first similarity rating when the result set is non-empty;
>
> determine a consolidated similarity rating according to the plurality of similarity ratings;
> generate a proposed model for combining the first data set and the second data set, wherein the first field is combined with the second field when the consolidated similarity rating is above a predefined threshold; and
> transmit the proposed model to the first computer system.

14. The computer network of claim 13, wherein the second computer system is further configured to:
> generate a results table configured to report the similarity rating for each field combination between the first field and the plurality of fields.

15. The computer network of claim 13, wherein determining a second similarity rating comprises:
> identifying an existing data model that contains a subset of the data in the first data set;
> identifying a field combination in the existing data model, the field combination being at least two fields that were combined in the existing data model;
> determining a binding type used to create the existing model; and
> generating the second similarity rating according to the binding type and the field combination.

16. The computer network of claim 13, wherein determining a second similarity rating comprises:
> identifying first metadata associated with the first data set and second metadata associated with the second data set;
> comparing the first metadata and the second metadata; and
> generating the second similarity rating based on the comparison.

17. The computer network of claim 13, wherein the first similarity rating is weighted according to a weight factor associated with the mapping property.

* * * * *